(12) United States Patent
Colletti

(10) Patent No.: US 8,145,613 B2
(45) Date of Patent: Mar. 27, 2012

(54) SYSTEM, METHOD AND APPARATUS FOR TRACKING AND RATING RENTERS

(75) Inventor: Lacey Michelle Colletti, Niceville, FL (US)

(73) Assignee: GuestStat, LLC., Niceville, FL (US)

( * ) Notice: Subject to any disclaimer, the term of this patent is extended or adjusted under 35 U.S.C. 154(b) by 780 days.

(21) Appl. No.: 11/861,046

(22) Filed: Sep. 25, 2007

(65) Prior Publication Data

US 2009/0083093 A1    Mar. 26, 2009

(51) Int. Cl.
*G06F 17/30* (2006.01)
(52) U.S. Cl. ........................................ 707/705
(58) Field of Classification Search .............. 707/705, 707/770; 705/4, 26.7, 28, 38 R, 307
See application file for complete search history.

(56) References Cited

U.S. PATENT DOCUMENTS

| | | | |
|---|---|---|---|
| 2002/0099575 A1* | 7/2002 | Hubbard et al. | 705/5 |
| 2003/0093289 A1 | 5/2003 | Thornley et al. | |
| 2008/0228747 A1* | 9/2008 | Thrall et al. | 707/5 |
| 2009/0037301 A1* | 2/2009 | Powell | 705/28 |
| 2009/0099944 A1* | 4/2009 | Robinson et al. | 705/30 |
| 2009/0106254 A1* | 4/2009 | McCoy | 707/10 |
| 2009/0210524 A1* | 8/2009 | McCormack et al. | 709/223 |
| 2009/0237245 A1* | 9/2009 | Brinton et al. | 340/540 |

OTHER PUBLICATIONS

Hotel Safeguard, The Hotel Fraud Detection and Deterent System, web site, Copyright 2008, WWW.hotelsafeguard.com/, U.S.

* cited by examiner

*Primary Examiner* — Shahid Alam
(74) *Attorney, Agent, or Firm* — Larson & Larson, P.A.; Frank Liebenow; Justin Miller

(57) ABSTRACT

An application for a method of tracking and assessing rentals includes entering renter information regarding a renter and entering rental assessment data regarding at least one rental at a client computer and transferring the renter information and the rental assessment data from the client computer to a server computer system. In the server computer system, an overall assessment is created from the rental assessment data and the renter information, the rental assessment data and the overall assessment is stored in a database record associated with the renter.

14 Claims, 16 Drawing Sheets

| Date | Length of Stay (days) | House Keeping | Conduct | Accounting/ Attendance | Rent Again | Comments | Reported By | Renter Reliability Assessment |
|---|---|---|---|---|---|---|---|---|
| 1/3/04 | 7 | 5 | 5 | 5 | Y | | J. Leno | 100% |
| 7/2/04 | 7 | 4 | 5 | 5 | Y | | T. Jones | 95% |
| 8/8/05 | 7 | 5 | 5 | 4 | Y | | J. Seinfeld | 95% |
| 1/1/06 | 7 | 3 | 4 | 5 | Y | Carpet had to be cleaned. Patio furniture had burn marks from cigarettes. Non-Smoking property. *PHOTOS | P. Newman | 85% |
| | | | | | | | | 94% (4) |

*FIG. 3*

YOUR NAME:
EMAIL ADDRESS:
PASSWORD:
RENTER NAME:
RENTER STREET:
RENTER CITY:
RENTER STATE:
RENTER ZIP CODE:
RENTER PHONE:
DRIVER'S LIC. & ST:
PROPERTY ID:

| HOUSEKEEPING | CONDUCT | ACCT/ATT | RENT AGAIN |
|---|---|---|---|
| 1 ○ | 1 ○ | 1 ○ | Y ○ |
| 2 ○ | 2 ○ | 2 ○ | N ○ |
| 3 ○ | 3 ○ | 3 ○ | |
| 4 ○ | 4 ○ | 4 ○ | |
| 5 ○ | 5 ○ | 5 ○ | |

| | | |
|---|---|---|
| YOUR NAME: | P. NEWMAN | |
| EMAIL ADDRESS: | PNEWMAN@YAHOO.COM | |
| PASSWORD: | ****** | |
| RENTER NAME: | JOE RENTER | |
| RENTER STREET: | 100 MAIN STREET | |
| RENTER CITY: | NICEVILLE | |
| RENTER STATE: | FLORIDA | |
| RENTER ZIP CODE: | 32578 | |
| RENTER PHONE: | 850-555-1212 | |
| DRIVER'S LIC. & ST: | 12345678900 | FL |
| PROPERTY ID: | 03777-04 | |

| HOUSEKEEPING | CONDUCT | ACCT/ATT | RENT AGAIN |
|---|---|---|---|
| 1 ○ | 1 ○ | 1 ○ | Y ● |
| 2 ○ | 2 ○ | 2 ○ | N ○ |
| 3 ○ | 3 ○ | 3 ○ | |
| 4 ○ | 4 ● | 4 ○ | [OK] |
| 5 ● | 5 ○ | 5 ● | |

*FIG. 8*

RENTER INFORMATION REQUEST FORM:

YOUR NAME: P. NEWMAN
EMAIL ADDRESS: PNEWMAN@YAHOO.COM
PASSWORD: ******
RENTER NAME: JANE RENTER
RENTER STREET: 100 MAIN STREET
RENTER CITY: NICEVILLE
RENTER STATE: FLORIDA
RENTER ZIP CODE: 32578
RENTER PHONE: 850-555-1212
RENTER DL: 123456789-00     FL

SUBMIT

Fill in as much information as available regarding the renter.

*FIG. 10*

RENTER INFORMATION RESULTS

| Field | Value |
|---|---|
| YOUR NAME: | P. NEWMAN |
| EMAIL ADDRESS: | PNEWMAN@YAHOO.COM |
| RENTER NAME: | JOE RENTER |
| RENTER STREET: | 100 MAIN STREET |
| RENTER CITY: | NICEVILLE |
| RENTER STATE: | FLORIDA |
| RENTER ZIP CODE: | 32578 |
| RENTER PHONE: | 850-555-1212 |
| NAME CONFIDENCE: | 99% |
| RENTER SCORE: | 94% |
| NUMBER OF RENTALS: | 4 |
| REVERSE PHONE TEST: | 100% |

[DETAILS] [DONE]

*FIG. 11*

JOE RENTER at 100 MAIN STREET, NICEVILLE, FLORIDA 32578. PH: 850-555-1212 —174

| Date | LOS | HK | Conduct | AA | RA | Comments | By | Assessment |
|------|-----|----|---------|----|----|----------|-----|------------|
| 1/3/04 | 7 | 5 | 5 | 5 | Y | | J. Leno | 100% |
| 7/2/04 | 7 | 4 | 5 | 5 | Y | | T. Jones | 95% |
| 8/8/05 | 7 | 5 | 5 | 4 | Y | | J. Seinfeld | 95% |
| 1/1/06 | 7 | 3 | 4 | 5 | Y | Carpet had to be cleaned. Patio furniture had burn marks from cigarettes. Non-Smoking property. *PHOTOS | P. Newman | 85% |
| | | | | | | | Average | 94% (4) |

170

173 — DONE

RENTAL AGENT INFORMATION

RENTAL AGENT NAME: P. NEWMAN — 181
EMAIL ADDRESS: PNEWMAN@YAHOO.COM — 182
OF ASSESSMENTS: 15 — 183
AVERAGE ASSESSMENT: 70% — 184

DONE — 189

SYSTEM, METHOD AND APPARATUS FOR TRACKING AND RATING RENTERS

FIELD OF THE INVENTION

This invention relates to the field of managing rental properties and more particularly to a system for tracking prior rentals and providing a meaningful measurement of the rental.

BACKGROUND OF THE INVENTION

There are many situations when a property such as homes, apartments, condominiums, cottages, bungalows, rooms, automobiles, recreational vehicles, boats, yachts, motorcycles, cruise ship rooms, etc. are rented. Likewise, certain services such as carrier airlines (e.g., they rent a seat), buses, shuttle services, limousines and the like and have similar characteristics to rental properties and have similar problems when rented.

The problem is that some renters are not as conscientious as they should be. Yes, most renters try hard to leave the property in the same or better shape than it was when they arrived. Unfortunately, the few renters that don't result in massive combined expenses on the part of the landlords for repairs, replacement and lost rentals during outages. Some potential problems resulting from bad renters are missing items (towels, furniture, silverware, etc.), broken items (TVs, radios, lamps), damage to structure (holes in walls, burn marks from cigarettes, etc.), catastrophic loss (fire, flood caused by renter) and violation of rules/laws (loud noise, smoking where prohibited, more than allowed number of guests, etc.).

If a landlord has an easy-to-use system to warn them of prior histories and problems with certain renters, that landlord can avoid renting to those with less than stellar histories, thereby potentially avoiding the expenses associated with the above list. Alternately, the landlord can request extra deposit money in the form of cash to cover potential damages. Unfortunately, such as system is not currently available.

U.S. Pat. Publication No. 2003/0093289 to Thornley, et al, describes a system for reporting and collecting rent payment history. The described system collects some information regarding leases (long term rentals), but provides only raw data for each rental and does not collect feedback from the prior landlords in a way that is useful in determining whether or not to rent to an individual, company or group.

What is needed is a system that will collect rental data including feedback and optional images and provide a quick assay of past rentals as a way of protecting landlords from potentially bad renters.

SUMMARY OF THE INVENTION

In one embodiment, a method of tracking and assessing rentals is disclosed including entering renter information regarding a renter and entering rental assessment data regarding at least one rental at a client computer and transferring the renter information and the rental assessment data from the client computer to a server computer system. In the server computer system, an overall assessment is created from the rental assessment data and the renter information, the rental assessment data and the overall assessment is stored in a database record associated with the renter.

In another embodiment, a system for tracking and collecting rental assessment data is disclosed including a plurality of client computers for capturing rental assessment data and for displaying rental assessment reports and a server computer in networked communication with the client computers. The client computers send the captured rental assessment data to the server computer. A database is interfaced with the server and the server stores the rental assessment data in rental assessment data records within the database. The server later retrieves and formats one or more rental assessment data records into a rental assessment report and sends the rental assessment report to one of clients where the clients display the rental assessment report. The rental assessment data includes at least renter information and a rental assessment.

In another embodiment, a signal tangibly embodied in a propagation medium comprising at least one instruction configured to implement a system for tracking and collecting rental assessment data is disclosed including computer readable instructions operating at a client computer for capturing renter information regarding a renter and computer readable instructions for capturing rental assessment data regarding at least one rental. Computer readable instructions are provided for transferring the renter information and for transferring the rental assessment data from the client computer to a server computer system. Computer readable instructions are provided for creating an overall assessment from the rental assessment data in the server computer system and computer readable instructions are provided for storing the renter information, the rental assessment data and the overall assessment in a database record associated with the renter in the server computer system.

In another embodiment, computer-based system for tracking and collecting rental assessment data is disclosed including client computers with software modules for capturing a plurality rental assessment data and a server computer networked with the client computers. Software modules running on the client computers send the captured rental assessment data to the server computer. Software modules running on the server computer receive the captured rental assessment data and other software modules running on the server computer store the captured rental assessment data in a database that is interfaced with the server computer. Other software modules running on the server computer extract the captured rental assessment data from the database and create a report. Software modules running on the server computer send the report to one of the client computers and software modules running on the client computers receive and display the report. The captured rental assessment data includes at least renter information and a rental assessment.

BRIEF DESCRIPTION OF THE DRAWINGS

The invention can be best understood by those having ordinary skill in the art by reference to the following detailed description when considered in conjunction with the accompanying drawings in which:

FIG. 3 illustrates a schematic view of a typical set of data collected for a certain renter as used of all embodiments of the present invention.

FIG. 7 illustrates a typical reviewer's data entry user interface of the present invention.

FIG. 8 illustrates a typical reviewer's data entry user interface of the present invention with data entered in the fields.

FIG. 10 illustrates a typical renter information request user interface of the present invention.

FIG. 11 illustrates a typical renter information reply user interface of the present invention.

FIG. 12 illustrates a typical detailed renter information reply user interface of the present invention.

FIG. 13 illustrates a typical rental information display user interface of the present invention.

DETAILED DESCRIPTION OF THE INVENTION

Figure 1:
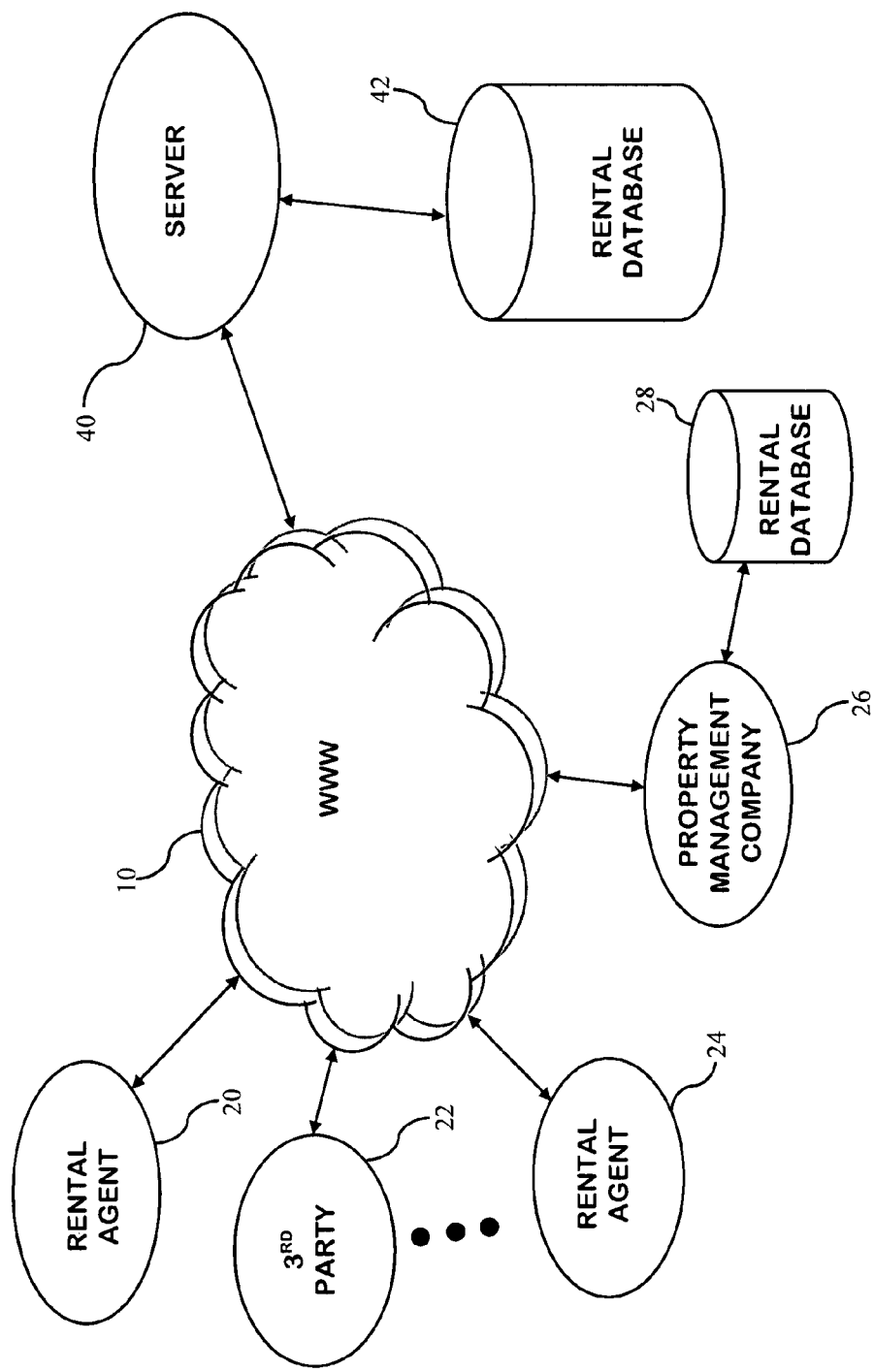
FIG. 1 illustrates a schematic view of a system of all embodiments of the present invention.

Reference will now be made in detail to the presently preferred embodiments of the invention, examples of which are illustrated in the accompanying drawings. Throughout the following detailed description, the same reference numerals refer to the same elements in all figures. Throughout this description, a single rental transaction is provided a rental assessment based upon the defined criteria and rental assessments associated with a particular renter are combined into an overall assessment, known as an RRAS (Renter Reliability Assessment Score).

Throughout this specification, the term "bad renter" is used to refer to a renter who, in the past, has had at least one incident that indicates they might not respect the rental property. The term is a relative term and has meaning to the landlord or rental agent in context with the rental property and property type. The rental agent is the entity that controls the property and the person who uses the present invention to determine if a renter is a "bad renter" based upon data and scores provided by the present invention. The "rental agent" is the decision maker regarding renting or not renting the property. The rental agent is any of a landlord, an agent in a property management company, an airline ticket agent or any person involved in the renting of a property where the property is any rentable property including airline seats, bus seats, rental cars, shuttle services, limousines, water craft, and the like.

Referring to FIG. 1, a schematic view of a system of the present invention is shown. The system includes a server 40 connected to the Internet 10 through ways known in the industry. The server 40 has access to a database 42 where the rental data and, typically, user authorization is stored. A plurality of rental agents 20/22/24 connect to the server 40 through the Internet 10 for providing rental history data and for retrieving past history data for a potential renter. In some embodiments where a property management company 26 is involved, an upload facility is provided for transferring renter data from the property management company's 26 database 28 to the server 40 for uploading into the rental database 42.

Figure 2:
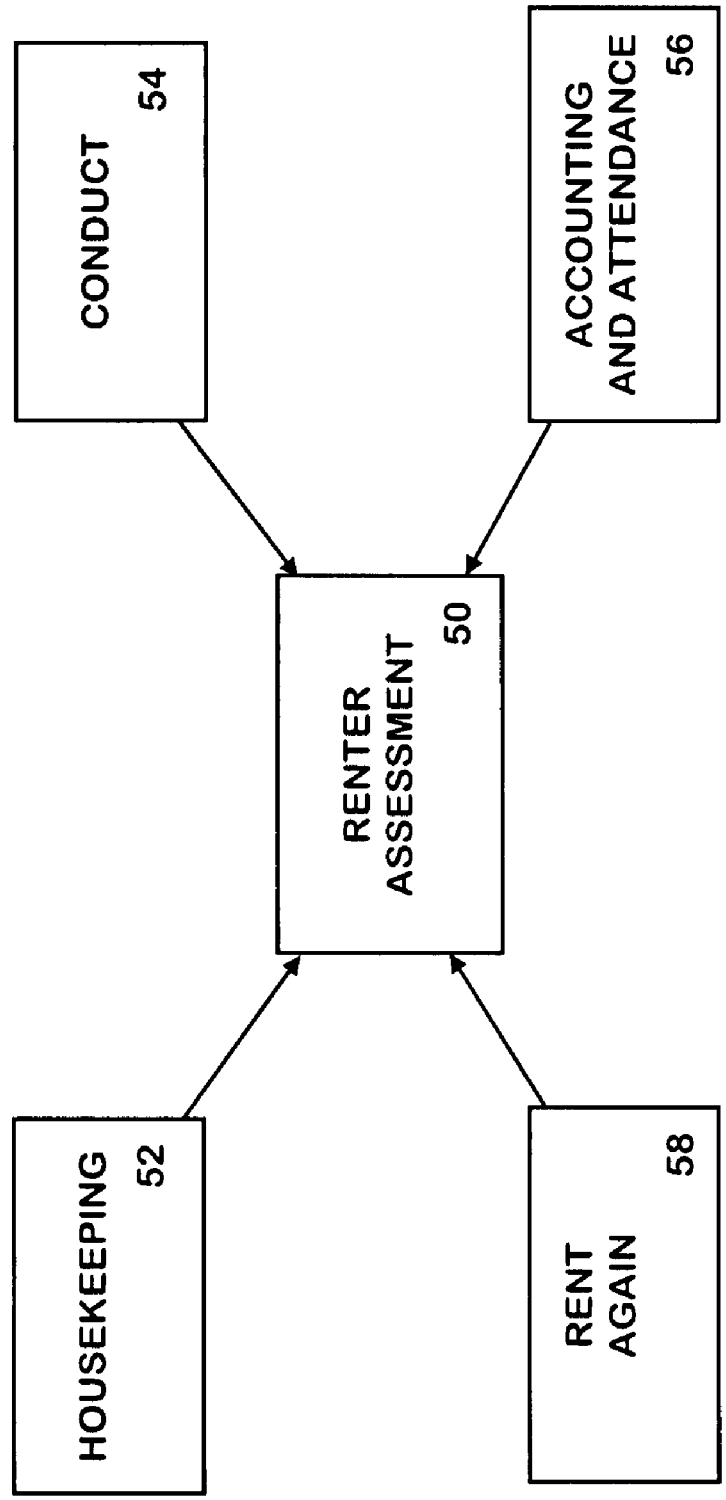
FIG. 2 illustrates a schematic view of a renter assessment of all embodiments of the present invention.

Referring to FIG. 2, a schematic view of a renter assessment of all embodiments of the present invention is shown. The renter assessment 50 is a numeric value derived from individual evaluation scores for various aspects of an individual rental. These aspects include, but are not limited to, housekeeping 52, conduct 54, accounting and attendance 56 and willingness to rent again 58. By combining the individual assessments 52/54/56/58 into a single numeric value, it is easier for the rental agents 20/22/24 to determine the risk involved with renting to a specific renter. For example, a rental agent 20/22/24 may agree to rent to an individual with a renter assessment 50 of over 90% and may agree to rent to an individual with a renter assessment 50 of between 80% and 90% given a larger deposit and may not agree to rent to an individual with a renter assessment 50 of less than 80%.

Referring to FIG. 3, a schematic view of a typical set of data collected for a certain renter as used of all embodiments of the present invention is shown. Each renter with a history has a record 51 that includes one or more entries for date of stay 60, length of stay 61, assessment for housekeeping 52, assessment for conduct 54, assessment for accounting/attendance 56, rent again 58 (would the rental agent rent to this person again), comments 62, rental agent reporting the history 64 and the overall assessment 50. In this exemplary record, history data has been accumulated relating to four different rentals on Jan. 3, 2004, Jul. 2, 2004, Aug. 8, 2005 and Jan. 1, 2006. Looking at the history data for the rental date 60 Jan. 1, 2006, the length of stay 61 was 7 days, the assessment for housekeeping 52 was 3, the assessment for conduct 54 was 4, the assessment for accounting/attendance 56 was 5, the renter again 58 (would the rental agent rent to this person again) was 5 (yes), there are comments 62 regarding the carpet and patio furniture 65, the rental agent reporting the history 64 was P. Newman 67 and the overall assessment 50 came out to be 85% 68. Additionally, one or more photo images 66 are included showing the damage to the carpet and patio furniture. An overall assessment 69 of 94% is indicated along with the total number of rentals 63 of 4 to this renter.

Figure 3A:
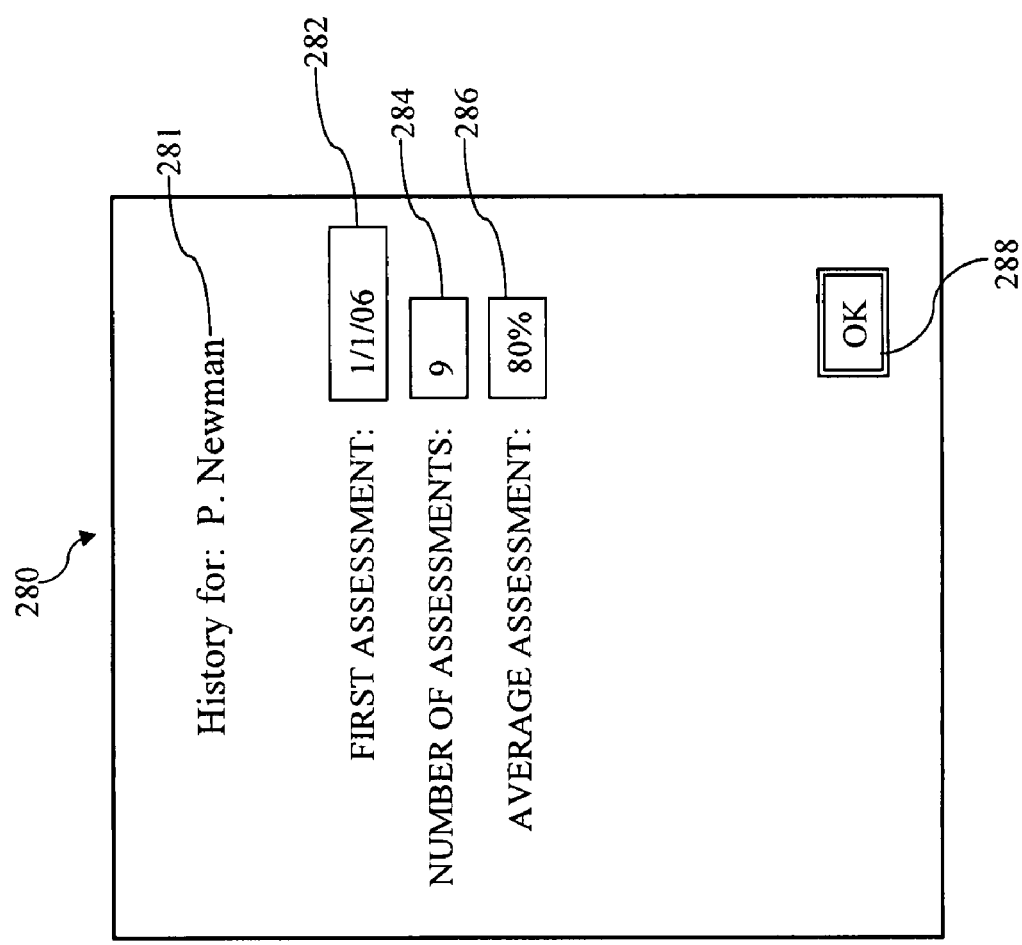
FIG. 3a illustrates a schematic view of a typical user interface for displaying history for a rental agent of all embodiments of the present invention.

The rental agent 67 is a hot link, selecting such will result in a data screen as in FIG. 3A showing history for that specific rental agent including number of assessments and average scoring for those assessments.

Referring to FIG. 3a, a schematic view of a typical user interface for displaying history for a rental agent is shown. This typical user interface is presented when a user of the present system clicks on (selects) the name 67 on a data record screen 51. The rental agent name 281 is displayed on the user interface 280 along with data regarding that rental agent 281. Data tracked and displayed includes, for example, the date of the rental agent's first assessment 282, the total number of assessments the rental agent has previously reported 284 and the average score the rental agent has given on those assessments 286. In other embodiments, additional information is presented such as contact information, type of rental property, etc. When finished viewing, selecting "OK" 288 returns to the previous user interface screen.

Figure 4:
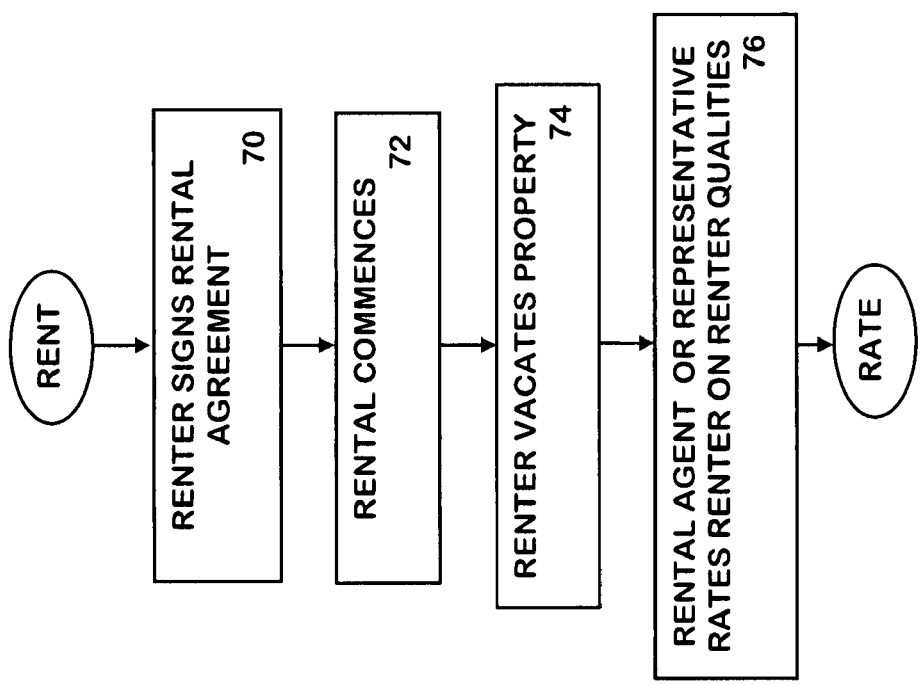
FIG. 4 illustrates a first flow chart of the present invention.

Referring to FIG. 4, a first flow chart of the present invention is shown. This typical flow occurs when a renter desires to rent a rental property. The renter typically signs a rental agreement 70, then on the date of the rental, the rental commences 72. After the renter leaves the property 74 the rental agent or a representative of the rental agent evaluates the condition in which the property was left 76.

Figure 5:
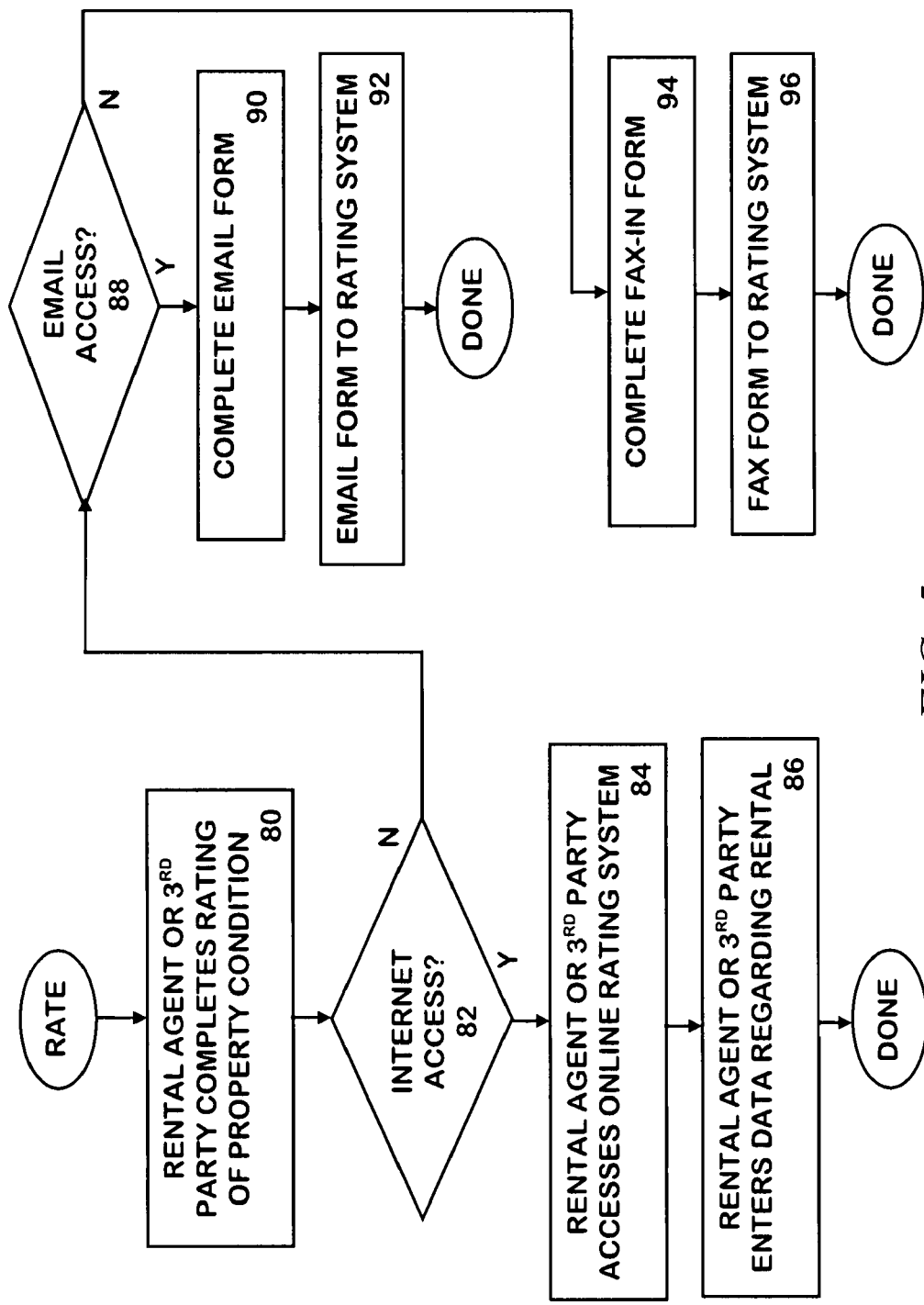
FIG. 5 illustrates a second flow chart of the present invention.

Referring to FIG. 5, a second flow chart of the present invention is shown. This typical flow occurs after the renter has left the property. The rental agent or the rental agent's representative completes his or her evaluation of the property 80. If the rental agent has internet access 82, the rental agent accesses the online rating system 84 and enters data regarding the condition of the property and renter qualities 86 into a form similar to the forms 120/130/140/144 shown later in this document. If the rental agent does not have internet access 82, but has email access 88, the rental agent completes an email form 90 (similar to the online forms 120/130/140/144) and emails the completed form 92 to the rating system server 40.

If the rental agent doesn't have email access 88, the rental agent completes a fax-in form 94 and faxes the form to a rating system administrator 96. Preferably, the form is scannable to reduce work and the chance of errors when entering the data into the database 42. In all cases, the data is checked and, if ok, the data is entered into the database 42.

Figure 6:
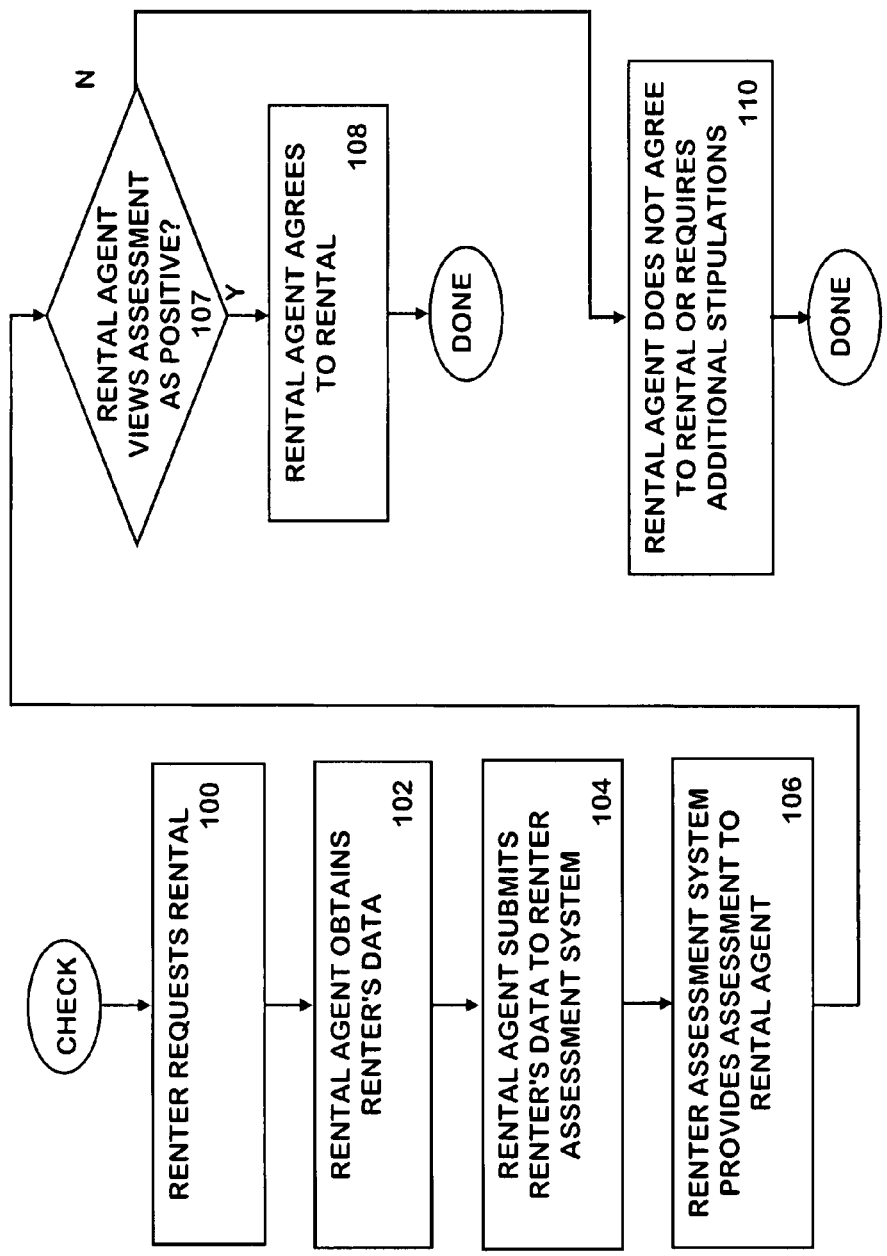
FIG. 6 illustrates a third flow chart of the present invention.

Referring to FIG. 6, a third flow chart of the present invention is shown. This flow occurs when a renter desires to rent a property 100. The rental agent is provided data from the renter 102 which includes the renter's name, address and other data that uniquely identifies that particular renter 102. The rental agent requests the renter's historical data 104 from the renter assessment system of the present invention using a form 150 as will be described later. The renter assessment system returns an assessment to the rental agent 106, typically in another form 160 as will be described. The rental agent reviews the assessment and, if it is positive 107, the rental agent agrees to rent the property to the renter 108. If the assessment is negative 107, the rental agent either refuses the rental or agrees to rent the property with added stipulations 110. The added stipulations include, for example, additional deposit money, a deposit paid in cash, higher rental rates, etc. It is up to the rental agent to determine if the assessment is positive or negative based upon the renter's score and, optionally, the types of prior problems and issues, etc.

Referring to FIG. 7, a typical reviewer's data entry user interface of the present invention is shown. In this typical data entry form 120, the rental agent provides their name, email address (or login name) and a password. In some embodiments, more or less information about the rental agent is provided.

The rental agent also provides as much data regarding the renter so as to confidently find the renter in the rental database 42. To reduce data entry time and, in some cases, improve the accuracy of finding the correct renter in the rental database 42, a browse function 121 is provided as known in the industry. By selecting the browse function 121 (in this case, selecting the hyperlinked "Renter Name"); the rental agent is presented with a way to search the rental database 42 to see if the renter already has an entry. If so, the renter's entry is used to populate the renter's data fields as known in the industry. The data regarding the renter includes one or more of: the renter's name, address, phone, cell phone, driver's license number, driver's license state, etc.

The agent also provides a property identification 123 that links the record to the specific property. This is useful to provide the rental agent with a way to review the rental history for a specific property. The rental agent would create a record for each property including such data as property name, address, local phone number, mailing address, point-of-contact at the property, rental manager's names and type of unit (3-bedroom condominium, 2 bedroom house, etc.).

Next, the rental agent rates the rental based upon housekeeping, conduct, accounting/attendance and whether the rental agent would rent to the renter again 122. It is anticipated that in some embodiments, other rating categories and possible selections will be offered. Housekeeping refers to the state of the property and contents after the rental and includes damage to the structure or contents, missing or stolen contents, soiling that requires cleaning beyond the norm, etc. Conduct includes conformance to the rules of the lease and local laws. Negative conduct is exemplified by disturbances such as noise, complaints from neighbors, law enforcement required, etc. Accounting/attendance includes deposit issues (e.g., credit card disputes), on-time departure, compliance with cancellation policy, returned checks, etc. Rent again is a yes/no choice as to whether the rental agent will in the future rent to this renter. Once the data and rating is complete, the rental agent selects (clicks) on "OK" 124 to enter the data into the rental database 42.

In some embodiments, the rental agent enters all information into the data screens 120/130/140 and comment screens 144. In some embodiments, a 3$^{rd}$ party provides the information to the rental agent. For example, a cleaning person or maintenance person informs the rental agent of issues and the rental agent enters the information into the data screens 120/130/140 and comment screens 144. In some embodiments, the data screens 120/130/140 and comment screens 144 are presented in segments, a first segment containing housekeeping items to be completed by the housekeeping or maintenance person (3$^{rd}$ party) and the second segment completed by the rental agent or landlord (e.g., payment data, "rent again").

Referring to FIG. 8, a typical reviewer's data entry user interface of the present invention with data entered in the fields is shown. In this typical filled-in data entry form 130, the rental agent has provided their name, email address and a password. The rental agent also provided as much data regarding the renter so as to confidently find the renter in the rental database 42. To reduce data entry time and, in some cases, improve the accuracy of finding the correct renter in the rental database 42, a browse function 131 is provided as known in the industry. By selecting the browse function 131 (in this case, selecting the hyperlinked "Renter Name"); the rental agent is presented with a way to search the rental database 42 to see if the renter already has an entry. If so, the renter's entry is used to populate the renter's data fields as known in the industry.

The data regarding the renter includes the renter's name (Joe Renter), address (100 Main Street, Niceville, Fla., 32578), phone (850-555-1212), driver's license number (12345678900) and driver's license state (FL). The rental agent has rated the rental based upon housekeeping (5=very good), conduct (4=acceptable), accounting/attendance (5=very good) and whether the rental agent would rent to the renter again 132 (yes). Housekeeping refers to the state of the property and contents after the rental and includes damage to the structure or contents, missing or stolen contents, soiling that requires cleaning beyond the norm, etc., in this case no issues were found. Conduct includes conformance to the rules of the lease and local laws. Negative conduct is exemplified by disturbances such as noise, complaints from neighbors, law enforcement required, etc., in this case, a neighbor complained about late-night noises. Accounting/attendance includes deposit issues (e.g., credit card disputes), on-time departure, compliance with cancellation policy, returned checks, etc., in this case, no issues occurred. Rent again is a yes/no choice as to whether the rental agent will in the future rent to this renter. In this case, the rental agent is willing to rent to the renter again in the future. Once the data and rating is complete, the rental agent selects (clicks) on "OK" 134 to enter the data into the rental database 42.

The agent also provides a property identification 123 (03777-04 in this example) that links the record to the specific property. This is useful to provide the rental agent with a way to review the rental history for a specific property. This property identification number is linked back to the specifics about the property as previously entered by the rental agent.

Figure 9:
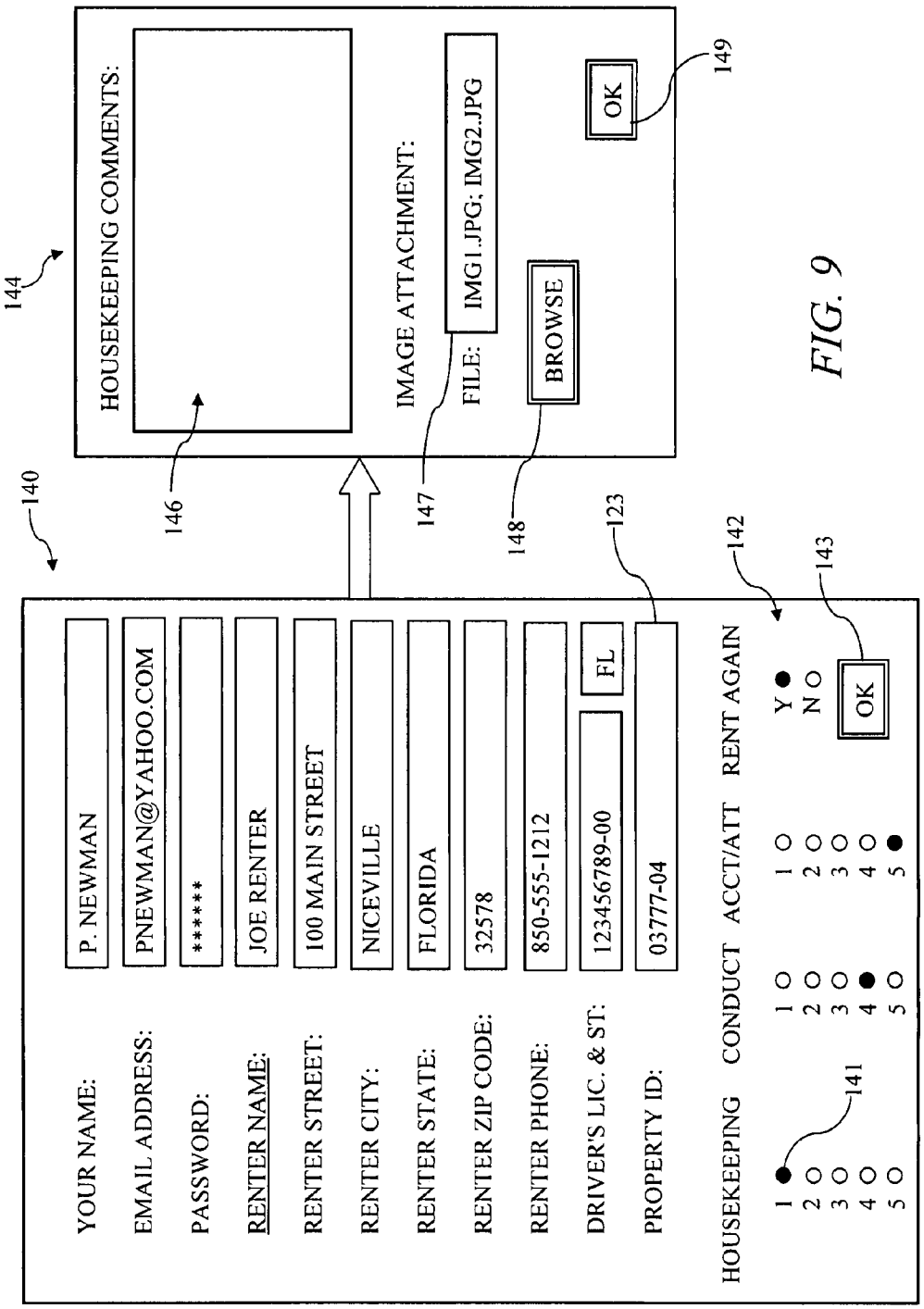
FIG. 9 illustrates a typical reviewer's data entry user interface of the present invention with data entered in the fields.

Referring to FIG. 9, a typical reviewer's data entry user interface of the present invention with data entered in the fields is shown. In this typical filled-in data entry form 140, the rental agent has provided their name, email address and a password. The rental agent also provided as much data regarding the renter so as to confidently find the renter in the rental database 42.

Figure 14:
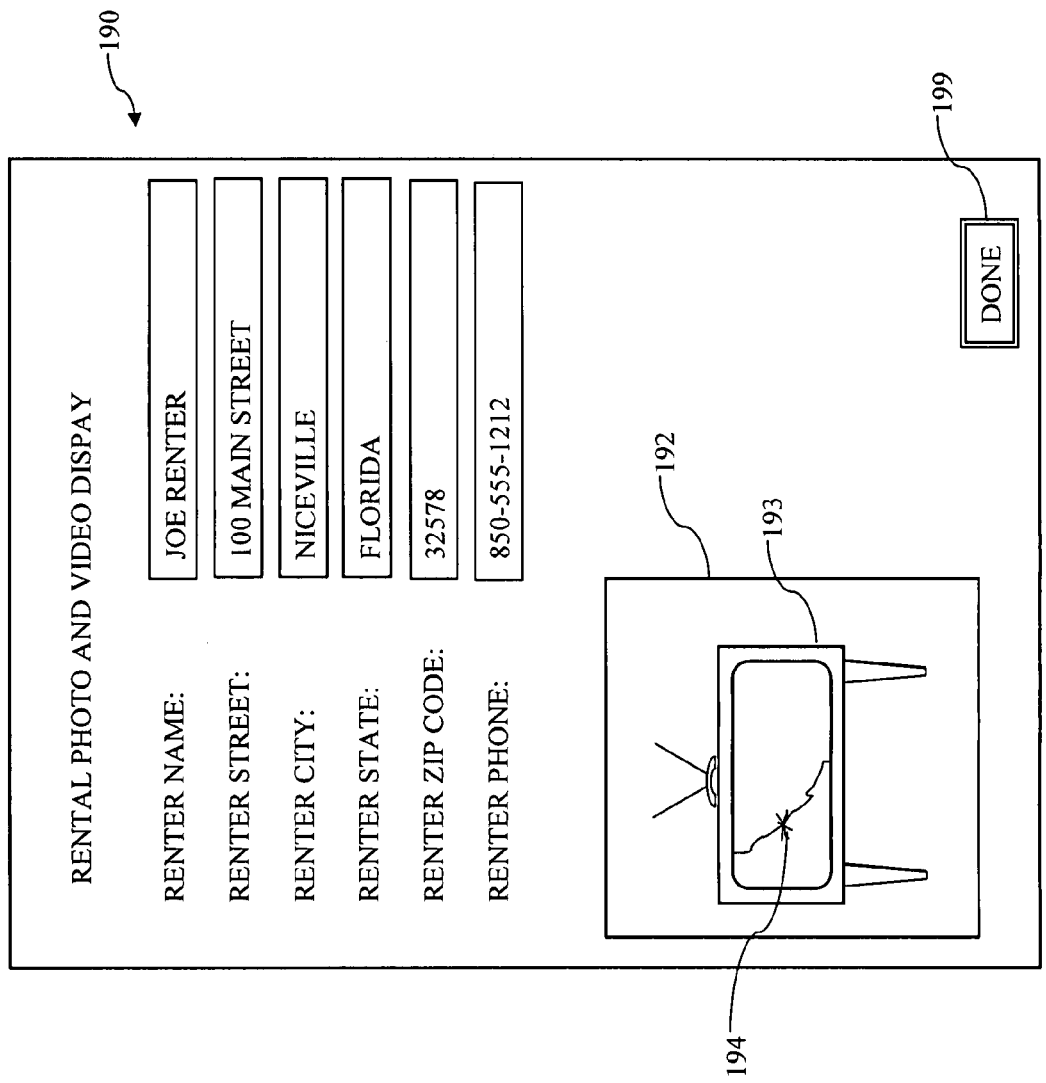
FIG. 14 illustrates a typical renter information photo display user interface of the present invention.

The data regarding the renter includes the renter's name (Joe Renter), address (100 Main Street, Niceville, Fla., 32578), phone (850-555-1212), driver's license number (12345678900) and driver's license state (FL). The rental agent has rated the rental based upon housekeeping (1=very poor), conduct (4=acceptable), accounting/attendance (5=very good) and whether the rental agent would rent to the renter again 142 (yes). Housekeeping refers to the state of the property and contents after the rental and includes damage to the structure or contents, missing or stolen contents, soiling that requires cleaning beyond the norm, etc., in this case a broken television was found after the renter vacated the property (as shown in FIG. 14). Conduct includes conformance to the rules of the lease and local laws. Negative conduct is exemplified by disturbances such as noise, complaints from neighbors, law enforcement required, etc., in this case, a neighbor complained about late-night noises. Accounting/attendance includes deposit issues (e.g., credit card disputes), on-time departure, compliance with cancellation policy, returned checks, etc., in this case, no issues occurred. Rent again is a yes/no choice as to whether the rental agent will in the future rent to this renter. In this case, the rental agent is willing to rent to the renter again in the future. Once the data and rating is complete, the rental agent selects (clicks) on "OK" 143 to enter the data into the rental database 42. In some embodiments, if a rating is poor or very poor, a request for comments screen 144 is presented to capture additional information regarding the less-than-acceptable rating. In this example, the rental agent rated housekeeping as very poor 141 because of the broken television. Therefore, the comment data entry screen 144 is labeled "Housekeeping comments." The rental agent is prompted to enter comments regarding the issue in the comments field 146 and, if available, one or more images are uploaded to the rental rating system as known in the industry, for example with a file name 147. In some embodiments, a browse function 148 is provided to locate the images on the rental agent's computer system as known in the industry. When the comments and optional images are complete, the rental agent selects "OK" 149 (or similar icon indicating they are finished) and the comments and images are attached to the rental record and stored in the rental database 42. It is well known how to import images into data records. In some embodiments, the images come from digital cameras and are stored on the user's computing system. In some embodiments, the images (still or motion) are captured on digital cameras or cell phones and either transferred onto the user's computing system or transferred directly to the server of the present invention.

In some embodiments, attempts are made to audit the comment data to assure the comments are usable. For example, if the comments consist of a minimum number of words or characters it will be determined that they are without value and the rental agent will not be allowed to progress until corrected. Other methods of making sure the comments are meaningful include, but is not limited to, performing a spelling check (if most or all of the words are miss-spelled, the rental agent probably entered garbage: dsff safdfas asfdfa fdsfasf), detecting a minimum number of words, detecting a minimum number of characters per word, detecting a maximum number of characters per word, etc.

In some embodiments, the reviewer is prompted to add comments for each picture/image and the comments are displayed in proximity to the picture image when the record is later retrieved (see FIG. 14).

The agent also provides a property identification 123 (03777-04 in this example) that links the record to the specific property. This is useful to provide the rental agent with a way to review the rental history for a specific property. This property identification number is linked back to the specifics about the property as previously entered by the rental agent.

Referring to FIG. 10, a typical renter information request user interface of the present invention is shown. The renter information form 150 is used by the rental agent before agreeing to a rental. The rental agent enters the rental agent's information, for example, name, email address (or login id) and password. Next, the rental agent enters as much information as possible regarding the renter. The rental rating system will use this to find a closest match to the renter as possible. To reduce data entry time and, in some cases, improve the accuracy of finding the correct renter in the rental database 42, a browse function 151 is provided as known in the industry. By selecting the browse function 151 (in this case, selecting the hyperlinked "Renter Name"); the rental agent is presented with a way to search the rental database 42 to see if the renter has an entry. If so, the renter's entry is used to populate the renter's data fields as known in the industry.

In this example, the rental agent entered the renter's name (Jane Renter), address (100 Main Street, Niceville, Fla., 32578), phone (850-555-1212), driver's license number (12345678900) and driver's license state (FL). Note that the name (Jane Renter) doesn't exactly match the previously used name (Joe Renter). Once as much information is entered as known, the rental agent selects the submit function 152 (or other completion indication as known in the industry) and the rental database 42 is searched by the server 40 and a rental report screen 160 is displayed (see FIG. 14).

Referring to FIG. 11, a typical renter report screen 160 of the present invention is shown. Typically, the renter report screen presents the information presented by the rental agent (rental agent's name, rental agent's email address, renter's data, etc.). In some embodiments, some information is not presented in the renter report screen, for example "password" is not displayed.

If an exact match based upon the renter's information is found, the name confidence 162 is 100% and the renter's score 163 and number of rentals 164 are displayed. If a non-exact match based upon the renter's information is found, the name confidence 162 is less than 100% (99% in this case) and the purported renter's score 163 and number of rentals 164 are displayed. In this case, the renter's first name 167, "Joe," didn't match the requested first name, "Jane." Because all of the other information matched, the record likely pertains to Jane, since they share the same last name, address and phone number. If other differences occurred, the confidence level would be lower (e.g., if the street address was different). Additional fields such as "Driver's License" and "Driver's License State" as in FIGS. 7, 8 and 9 serve to improve the accurate tracking of individual renters.

In some embodiments, if a non-exact match based upon the renter's information is found and the name confidence 162 is less than a specific threshold (e.g., the name confidence is less than 85%), the user must decide if the confidence is high enough to continue with the search. In some embodiments, the user must agree by selecting a screen icon (not shown) or other method known in the industry, at such time, they will be presented with the renter's score 163 and number of rentals 164, etc., and will be billed for the search/access.

In some embodiments, a reverse phone number lookup is performed by the server. Reverse phone number lookups are provided by many online databases and are known in the industry. By providing the renter's phone number to such a service, the service returns the renter's address. If the renter's address reasonably matches the address provided by the renter, the reverse phone test field 165 indicates such. In this example, 100% in the reverse phone test field 165 indicates the address from the reverse phone lookup completely matches that provided by the renter. If it differed slightly (e.g., "Main Street" vs. "Main Avenue") a number slightly less than 100% appears in the reverse phone test field 165. If there were major differences (e.g., "Main Street" vs. "Broadway") a number much less than 100% appears in the reverse phone test field 165. In some embodiments, the reverse phone test field 165 indicates a match (e.g., "OK") or an unacceptable difference ("e.g., "ERROR").

When the rental agent is finished viewing the renter's information, the rental agent selects "DONE" (or similar) icon 169 and continues. If the rental agent is interested in seeing details regarding the renter, the rental agent selects a "DETAILS" (or similar) icon 161.

Referring to FIG. 12, a typical detailed renter information reply user interface of the present invention is shown. If the rental agent selects "DETAILS" icon 161 on the rental information screen 160, a detail screen 170 or similar is displayed. The detail screen 170 typically includes the renter's name and other data 174 and detailed ratings from previous rentals such as the date of stay, length of stay, housekeeping rating, conduct rating, accounting and attendance rating, rent again rating, comments, photographs (if available), the rental agent who made the assessment and the overall assessment. If the rental agent needs information regarding the rental agent making the assessment 172, a rental agent selects (clicks) on the rental agent's name 172 and a detail screen 180 is displayed (see FIG. 13). If a photo or video of the damage is attached to the rental record, a hot link 171 is provided to access the photo or video. If the rental agent needs to see images of the damage, the rental agent selects (clicks) on the "PHOTOS" selector or icon 171 and a photos/video screen 190 is displayed (see FIG. 14). The user selects the "done" icon 173 to return to the previous user interface.

Referring to FIG. 13, a typical rental information display user interface of the present invention is shown. This user interface 180 is displayed after the rental agent selects (clicks) on the rental agent's name 172. This exemplary user interface displays the rental agent's name 181, email address 182, the number of assessments made by the rental agent 183 and the average assessment of all assessments made by the rental agent 184. In other embodiments, more or less information regarding the rental agent is displayed, for example the firm at which the rental agent is employed and the firm's address, etc. When the rental agent is finished viewing the rental agent's information, the rental agent selects "DONE" (or similar) icon 189 and continues.

Referring to FIG. 14, a typical renter information photo/video display user interface of the present invention is shown. If the rental agent needs to see images of an issue, the rental agent selects (clicks) on the "PHOTOS" selector or icon 171 and a photo/video user interface screen 190 is displayed. In this exemplary photo/video display user interface 190, some or all of the renter's information is displayed (name, address, phone) and one or more images or video frames 192. In this example, one image of the broken television 193 is shown within an image/video frame 192. Note the damage to the glass of the television 194. In some embodiments, multiple images are displayed on one screen, thumbnails are displayed and clicking on the thumbnails enlarges the image, single images are displayed per page with next/previous operations, etc. If a video frame 192 is displayed, clicking on the video frame 192 initiates playing of the video. Displaying images and video is well known in the art and all methods of displaying images, enlarging images and playing video are included here within. When the rental agent is finished viewing the photo/video display user interface 190, the rental agent selects the "done" icon 199 and returns to the previous user interface screen.

Figure 15:
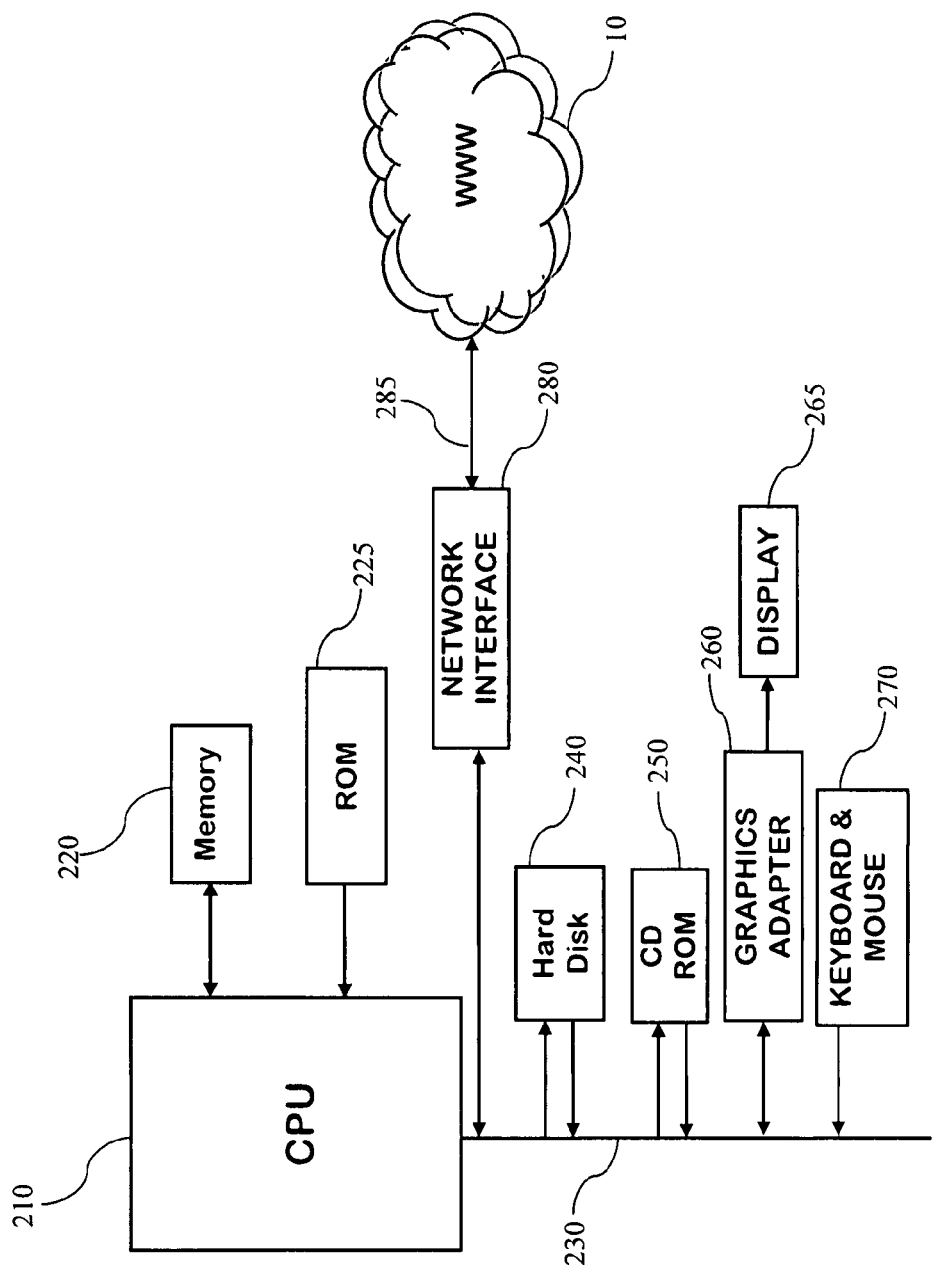
FIG. 15 illustrates a typical computer system of the present invention.

Referring to FIG. 15, a schematic diagram of a computer system of all embodiments of the present invention will be described. Although shown in its simplest form, having a single processor, many different computer architectures are known that accomplish similar results in a similar fashion and the present invention is not limited in any way to any particular computer system. The present invention works well utilizing a single processor system as shown in FIG. 15, a multiple processor system where multiple processors share resources such as memory and storage, a multiple server system where several independent servers operate in parallel (perhaps having shared access to the data or any combination). In this, a processor 210 is provided to execute stored programs that are generally stored for execution within a memory 220. The processor 210 can be any processor or a group of processors, for example an Intel Pentium-4® CPU or the like. The memory 220 is connected to the processor and can be any memory suitable for connection with the selected processor 210, such as SRAM, DRAM, SDRAM, RDRAM, DDR, DDR-2, etc. Firmware is stored in firmware storage 225 that is connected to the processor 210 and may include initialization software known as BIOS. This initialization software usually operates when power is applied to the system or when the system is reset.

Also connected to the processor 210 is a system bus 230 for connecting to peripheral subsystems such as a network interface 280, a hard disk 240, a CDROM 250, a graphics adapter 260 and a keyboard/mouse 270. The graphics adapter 260 receives commands and display information from the system bus 230 and generates a display image that is displayed on the display 265.

In general, the hard disk 240 may be used to store programs, executable code and data persistently, while the CDROM 250 may be used to load said programs, executable code and data from removable media onto the hard disk 240. These peripherals are meant to be examples of input/output devices, persistent storage and removable media storage. Other examples of persistent storage include core memory, FRAM, flash memory, etc. Other examples of removable media storage include CDRW, DVD, DVD writeable, compact flash, other removable flash media, floppy disk, ZIP®, etc. In some embodiments, other devices are connected to the system through the system bus 230 or with other input-output connections. Examples of these devices include printers; graphics tablets; joysticks; and communications adapters such as modems and Ethernet adapters.

The network interface 280 connects the computer-based system to the world-wide-web 10 through a link 285 which is, preferably, a high speed link such as a cable broadband connection, a Digital Subscriber Loop (DSL) broadband connection, a T1 line or a T3 line.

Equivalent elements can be substituted for the ones set forth above such that they perform in substantially the same manner in substantially the same way for achieving substantially the same result.

It is believed that the system and method of the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A method of tracking and assessing rentals, the method comprising:
    entering renter information regarding a renter and entering rental assessment data regarding at least one rental at a client computer, the client computer being one of a plurality of client computers;
    transferring the renter information and the rental assessment data from the client computer to a server computer system;
    calculating an overall numerical assessment value from the rental assessment data in the server computer system;
    storing the renter information, the rental assessment data and the overall numerical assessment value in rental assessment data records within a database record associated with the renter in the server computer system;
    formatting one or more of the rental assessment data records into a rental assessment report, the server computer sending the rental assessment report to one of the plurality of clients;
    wherein the rental assessment data includes at least one data element from the group consisting of a rental assessment for housekeeping, a rental assessment for conduct, and a rental assessment for accounting/attendance.

2. The method of tracking and assessing rentals of claim 1, wherein the step of entering renter information further comprises entering rental agent information and the step of storing the renter information, the rental assessment data and the overall numerical assessment value in a database record further comprises storing the rental agent information in the database record associated with the renter.

3. The method of tracking and assessing rentals of claim 1, wherein the renter information includes a renter name, a renter address and a renter phone number.

4. The method of tracking and assessing rentals of claim 2, wherein the rental agent information includes a rental agent name and a rental agent email address.

5. The method of tracking and assessing rentals of claim 1, wherein the rental assessment comprises values for a rental assessment for housekeeping, a rental assessment for conduct and a rental assessment for accounting/attendance.

6. The method of tracking and assessing rentals of claim 1, wherein the overall numerical assessment value is a percentage value based upon the rental assessment.

7. The method of tracking and assessing rentals of claim 1, further comprising the steps of:
    retrieving a stored database record related to a potential renter; and
    deciding whether to rent to the potential renter based on the rental assessment data from the stored database record.

8. A computer program embodied in a storage medium comprising at least one instruction configured to implement a system for tracking and collecting rental assessment data, wherein the at least one instruction comprises:
    computer readable instructions for capturing renter information regarding a renter and computer readable instructions for capturing rental assessment data regarding at least one rental at a client computer, the client computer being one of a plurality of client computers;
    computer readable instructions for transferring the renter information and computer readable instructions for transferring the rental assessment data from the client computer to a server computer system;
    computer readable instructions for numerically calculating an overall assessment value from the rental assessment data in the server computer system;
    computer readable instructions for storing the renter information, the rental assessment data and the overall assessment value in rental assessment data records within a database record associated with the renter in the server computer system;
    computer readable instructions for formatting one or more of the rental assessment data records into a rental assessment report, computer readable instructions for sending the rental assessment report to one of the plurality of clients;
    wherein the rental assessment data includes at least one data element from the group consisting of a rental assessment for housekeeping, a rental assessment for conduct, and a rental assessment for accounting/attendance.

9. The computer program embodied in a storage medium comprising at least one instruction configured to implement a system for tracking and collecting rental assessment data of claim 8, wherein the computer readable instructions for capturing renter information further comprises computer readable instructions for capturing rental agent information and the computer readable instructions for storing the renter information, the rental assessment data and the overall assessment in a database record further includes computer readable instructions for storing the rental agent information in the database record associated with the renter.

10. The computer program embodied in a storage medium comprising at least one instruction configured to implement a system for tracking and collecting rental assessment data of claim 9, wherein the rental agent information includes a rental agent name and a rental agent email address.

11. The computer program embodied in a storage medium comprising at least one instruction configured to implement a system for tracking and collecting rental assessment data of claim 8, wherein the renter information includes a renter name, a renter address and a renter phone number.

12. The computer program embodied in a storage medium comprising at least one instruction configured to implement a system for tracking and collecting rental assessment data of claim 8, wherein the rental assessment data includes at least a rental assessment for housekeeping, a rental assessment for conduct and a rental assessment for accounting/attendance.

13. The computer program embodied in a storage medium comprising at least one instruction configured to implement a system for tracking and collecting rental assessment data of claim 8, wherein the overall assessment value is a percentage value calculated from the rental assessment data.

14. The computer program embodied in a storage medium comprising at least one instruction configured to implement a system for tracking and collecting rental assessment data of claim 8, further comprising:
    computer readable instructions for retrieving at least one stored database record related to a potential renter; and
    computer readable instructions for combining the stored database records into a report, the report comprising data from each stored database record and an overall assessment value of the potential renter, the overall assessment value is calculated from the rental assessment data; and
    computer readable instructions for sending the report from the server to the client computer.

* * * * *